F. H. MILLER.
ELECTROLYTIC CELL.
APPLICATION FILED APR. 5, 1917.
1,390,575. Patented Sept. 13, 1921.
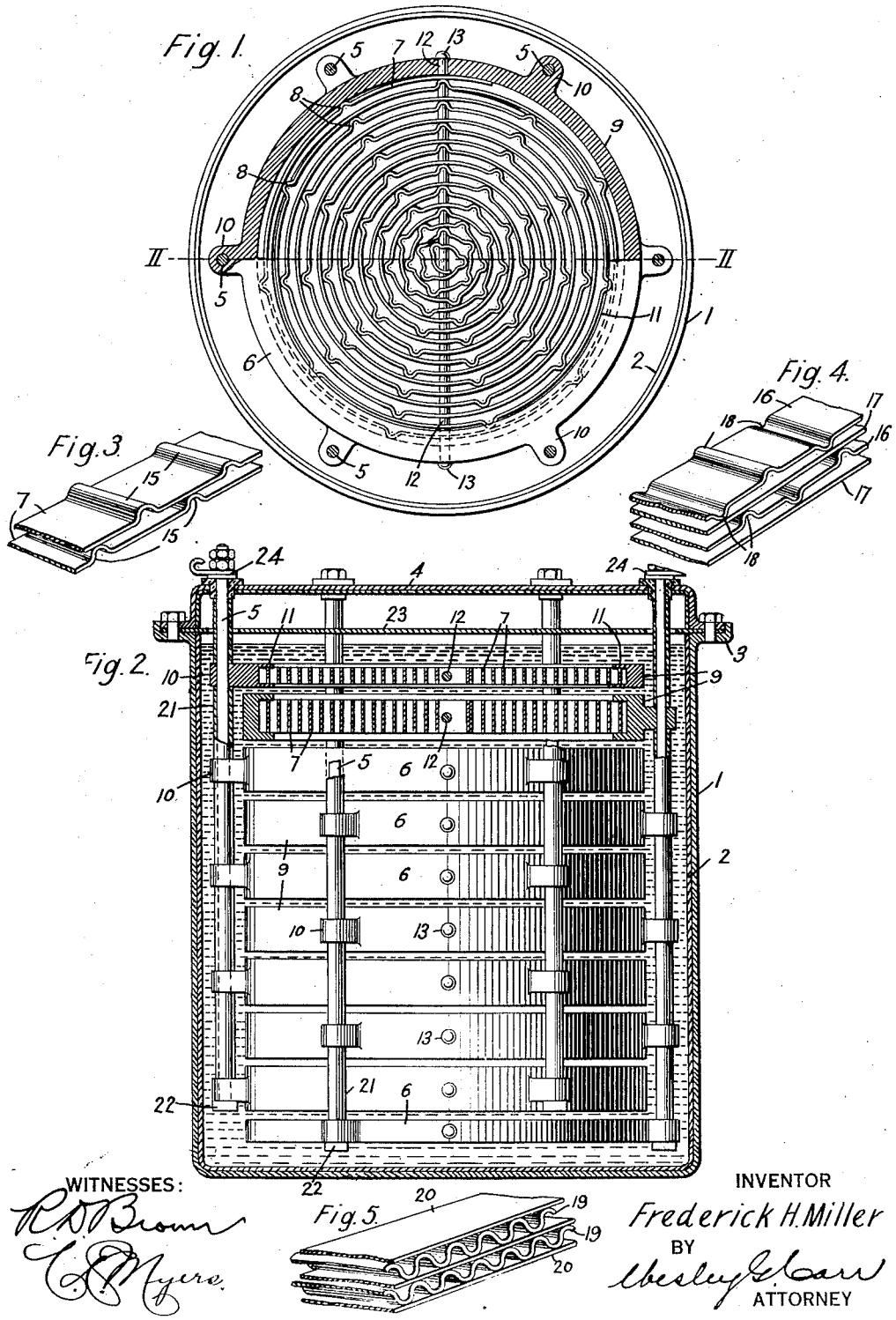

UNITED STATES PATENT OFFICE.

FREDERICK H. MILLER, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTROLYTIC CELL.

1,390,575.

Specification of Letters Patent. Patented Sept. 13, 1921.

Application filed April 5, 1917. Serial No. 159,961.

*To all whom it may concern:*

Be it known that I, FREDERICK H. MILLER, a citizen of the United States, and a resident of Wilkinsburg, in the county of Allegheny and State of Pennsylvania, have invented a new and useful Improvement in Electrolytic Cells, of which the following is a specification.

My invention relates to electrolytic cells, such as condensers, lightning arresters, rectifiers and the like, and it has for its object to provide an electrode construction for cells of the character indicated which shall present a large surface area to the action of the electrolyte of the cell in proportion to the volume occupied by the electrode and which shall therefore be adapted for use where the cell is required to occupy as little space as possible.

In the accompanying drawing, Figure 1 is a plan view, with parts shown in section and with the cover removed, of an electrolytic cell constructed in accordance with my invention. Fig. 2 is a side view, partially in elevation and partially in section, of the structure of Fig. 1, the section being taken substantially along the line II—II, Fig. 1. Figs. 3, 4 and 5 are fragmentary perspective views showing modified forms of electrode construction.

Electrolytic cells of the kind to which my invention relates are composed of a considerable number of electrodes arranged in side-by-side relation, the alternate electrodes being connected in two sets of opposite polarity and all of the electrodes being composed of aluminum, magnesium, tantalum or other material upon which asymmetric conducting films may be produced and maintained when the electrodes are immersed in a suitable electrolyte. It is important that each electrode shall present as large a surface area as possible to the action of the electrolyte in order that the capacity of the cell per unit volume may be sufficiently large for effective operation.

My present invention is concerned with the production of an electrode of the character indicated that shall be composed of filming strip material wound spirally in spaced convolutions and held in a suitable supporting ring. The successive convolutions composing the spirally wound electrode are preferably spaced apart by means of projections formed in the strip material itself, and a plurality of electrodes, constructed in the manner described, are either superposed or placed vertically side-by-side in a suitable container, in which they are supported in any usual or convenient manner.

For a more particular description of my invention, reference may be had to Figs. 1 and 2 of the accompanying drawing, which illustrate an electrolytic cell comprising a circular container 1 which may suitably be composed of seamless sheet metal and be preferably provided with a lining 2 of aluminum or such other filming material as is employed for the electrodes of the cell. The open end of the container 1 is provided with a peripheral flange 3, to which is bolted a cover 4. Six vertical rods 5 are suspended from the cover 4 and support a series of superposed electrodes 6.

Each of the electrodes 6 is composed of a strip or ribbon 7 of aluminum or other filming material wound spirally, as shown in Fig. 1, and provided, at suitable intervals, with transverse projections 8 which serve to space the convolutions of the ribbon sufficiently to permit free circulation of the electrolyte and proper formation of the polarizing films thereon. In the construction shown in Fig. 1, the projections 8 are formed in the ribbon at such intervals that, when the material is wound into its spiral form, the projections will arrange themselves in somewhat the manner shown in this figure, each of the projections being spaced from the adjacent projections in the convolution which it touches. It will be observed that the distances between the projections, measured along the ribbon, increase progressively from the center to the circumference of the electrode.

The electrode spiral, after being wound to the desired diameter, is placed within an internally grooved ring 9 or other clamping device for confining and supporting the spiral coil. The coil support is preferably composed of the same material as the ribbon and is provided with three equally spaced and outwardly projecting lugs 10 which are perforated to receive the vertical suspension rods 5. The spiral may be wound tightly, placed within the ring and then slightly unwound in order to cause it to enter the internal groove in the ring, or one of the inner flanges 11 of the ring may be bent upward, the spiral inserted, and the flange bent down into the position shown.

In order to prevent the inner convolutions of the electrode spiral from bending laterally, a rod 12 is passed diametrally through the convolutions of the spiral and its supporting ring, the ends of the rod being upset against the outer side of the ring, as shown at 13. An opening to receive the rod 12 is preferably bored through the electrode after the spiral and the ring have been assembled.

Fig. 3 shows a form of electrode strip provided with equally spaced projections 15 instead of the unequally spaced projections required by the construction shown in Fig. 1. When the strip shown in Fig. 3 is wound into a spiral, the projections 15 will sometimes coincide, either wholly or in part, but the number of such coincident pairs of projections is relatively small and the resulting spiral is substantially the same as that shown in Fig. 1, except for the more irregular arrangement of the spacing projections.

Fig. 4 shows a further modification in the electrode construction, in which two strips 16 and 17 are spirally wound together. The strip 16 is provided with projections 18 which alternate on the two sides of the strip, while the strip 17 is without projections of any kind. When the two ribbons 16 and 17 are wound together, even spacing of the ribbons is insured, irrespective of the distances between the projections and the ribbon 16.

Fig. 5 shows a still further modification in which a continuously corrugated ribbon 19 is wound together with a plain ribbon 20. The effect of this construction is substantially like that shown in Fig. 4, except that the effective area of the corrugated ribbon 19, in proportion to its length, is considerably greater than that which is afforded by either of the other forms of construction which I have shown herein.

The several electrodes composing the cell shown in Figs. 1 and 2 are so arranged, one above another, that the supporting lugs 10 of each electrode are in vertical alinement with the corresponding lugs of all of the electrodes belonging to a set of the same polarity and are angularly spaced from the lugs belonging to electrodes of the set of opposite polarity. Each of the supporting rods 5, depending from the cover 4 of the cell, therefore engages all of the plates of one polarity but none of the plates of the opposite polarity. The several plates are vertically spaced apart the proper distances by means of spacing sleeves 21 which surround the supporting rods 5 between the lugs 10, and the lower electrode of each set rests upon flanges or nuts 22 upon the lower ends of the rods 5.

The upper and lower electrodes are of one-half the thickness of the intermediate electrodes since each of the intermediate electrodes coöperates with an electrode above and below it, while the upper and lower electrodes coöperate with one adjacent electrode only. A splash-plate 23 may be clamped between the cover 4 and the flange 3 of the container, suitable openings being provided therein for the rods and spacing sleeves 5 and 21. Terminal devices 24 are secured to the upper ends of two of the suspension rods 5 which are associated with sets of electrodes of opposite polarity.

While I have illustrated certain forms of electrode construction which are well adapted to carry my invention into practice, it is to be understood that the principles of my invention may be employed in various other constructions which may readily be devised by persons skilled in the art to which my invention relates. I therefore desire that the structural details which I have shown and described be taken as illustrative only and not as imposing limitations upon my invention, the scope of which is indicated in the appended claims.

I claim as my invention:

1. An electrode for electrolytic condensers, lightning arresters, rectifiers and the like comprising a spirally wound strip of filming material and means integral with the said strip for spacing apart the convolutions of the said strip.

2. An electrode for electrolytic condensers, lightning arresters, rectifiers and the like comprising a spirally wound strip of filming material provided with spaced integral corrugations serving to space apart the convolutions of the said strip.

3. An electrode for electrolytic condensers, lightning arresters, rectifiers and the like comprising a spirally wound strip of filming material provided with equally spaced integral corrugations serving to space apart the convolutions of the said strip.

4. An electrode for electrolytic condensers, lightning arresters, rectifiers and the like comprising a spirally wound strip of filming material provided with spaced integral corrugations and a plain strip of filming material disposed between the successive convolutions of the said corrugated strip.

5. An electrode for electrolytic condensers, lightning arresters, rectifiers and the like comprising a spirally wound strip of aluminum provided with equally spaced integral corrugations serving to space apart the convolutions of the said strip.

6. An electrode for electrolytic condensers, lightning arresters, rectifiers and the like comprising a spirally wound strip of aluminum provided with spaced integral corrugations and a plain strip of filming material disposed between the successive convolutions of the said corrugated strip.

7. An electrode for electrolytic condensers, lightning arresters, rectifiers and the like comprising a spirally wound strip of filming material provided with spaced transverse corrugations and an internally grooved ring of filming material for confining and supporting the said spirally wound strip and provided with outwardly extending supporting lugs.

8. An electrode for electrolytic condensers, lightning arresters, rectifiers and the like comprising a spirally wound strip of aluminum provided with spaced transverse corrugations and an internally grooved ring of aluminum for confining and supporting the said spirally wound strip and provided with outwardly extending supporting lugs.

9. An electrolytic cell comprising a circular container and a plurality of superposed electrodes disposed within the said container and supported therein in two sets of alternate electrodes, each of the said electrodes comprising a spirally wound strip of filming material and an internally grooved ring for confining and supporting the said spirally wound strip.

10. An electrolytic cell comprising a circular container and a plurality of superposed electrodes disposed within the said container and supported therein in two sets of alternate electrodes, each of the said electrodes comprising a spirally wound strip of aluminum provided with spaced transverse corrugations and an internally grooved ring for confining and supporting the said spirally wound strip.

11. An electrode for electrolytic condensers, lightning arresters, rectifiers and the like comprising a spirally wound strip of filming material and a ring of filming material for confining and supporting the wound strip.

12. An electrode for electrolytic condensers, lightning arresters, rectifiers and the like comprising a spirally wound strip of filming material formed with spaced projections whereby the convolutions are maintained in spaced relation and means formed of filming material for holding the spirally wound strip in position.

13. An electrode for electrolytic condensers, lightning arresters, rectifiers and the like comprising a spirally wound strip of film-forming material, an internally grooved ring of film-forming material for confining and supporting the wound strip and a bracing rod of film-forming material passed through the ring and the convolutions of the strip.

In testimony whereof I have hereunto subscribed my name this 29th day of March, 1917.

FREDERICK H. MILLER.